(12) United States Patent
Lee et al.

(10) Patent No.: US 8,214,149 B2
(45) Date of Patent: Jul. 3, 2012

(54) NAVIGATION APPARATUS AND POSITIONING METHOD THEREOF

(75) Inventors: Meng-Shu Lee, Hsinchu Hsien (TW); Ying-Chuan Liu, Taipei (TW); Chien-Wei Ho, Hsinchu (TW); Yu Hui Hsu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 505 days.

(21) Appl. No.: 12/480,140

(22) Filed: Jun. 8, 2009

(65) Prior Publication Data
US 2009/0319183 A1    Dec. 24, 2009

(30) Foreign Application Priority Data

Jun. 24, 2008  (TW) .............................. 97123459 A (51) Int. Cl.
*G01C 21/00*  (2006.01)
(52) U.S. Cl. ...................................................... 701/533
(58) Field of Classification Search .......... 701/200–202, 701/208–209, 527, 533; 340/988
See application file for complete search history.

(56) References Cited

U.S. PATENT DOCUMENTS

| 5,862,511 | A | 1/1999 | Croyle et al. |
| 5,948,043 | A | 9/1999 | Mathis |
| 7,603,233 | B2 * | 10/2009 | Tashiro .......................... 701/214 |
| 7,756,634 | B2 * | 7/2010 | Mori ............................... 701/208 |
| 8,041,472 | B2 * | 10/2011 | Kobori et al. ...................... 701/8 |
| 2002/0062193 | A1 | 5/2002 | Lin |
| 2007/0257837 | A1 * | 11/2007 | Watanabe et al. ......... 342/357.14 |
| 2010/0042322 | A1 * | 2/2010 | Won ............................... 701/213 |

FOREIGN PATENT DOCUMENTS
WO    2005076031 A2    8/2005

OTHER PUBLICATIONS

European Search Report, EP09007673 (6 pages).

* cited by examiner

*Primary Examiner* — Yonel Beaulieu
(74) *Attorney, Agent, or Firm* — Edell, Shapiro & Finnan, LLC (57) ABSTRACT

A positioning method for a navigation apparatus and the navigation apparatus are provided. The positioning method includes steps of receiving a Global Positioning System (GPS) signal; reading a previous position-velocity-time (PVT) data; reading a previous map matching (MMT) result; and computing current PVT data according to at least one of the previous PVT data and the previous MMT result.

17 Claims, 8 Drawing Sheets

NAVIGATION APPARATUS AND POSITIONING METHOD THEREOF

CROSS REFERENCE TO RELATED PATENT APPLICATION

This patent application is based on Taiwan, R.O.C. patent application No. 097123459 filed on Jun. 24, 2008.

FIELD OF THE INVENTION

The present invention relates to a positioning method, and more particularly, to a positioning method for a navigation apparatus.

BACKGROUND OF THE INVENTION

A navigation apparatus provides a user with guidance for traveling on correct routes, so that the user is free from having to constantly look at maps and watch for road signs. However, Global Positioning System (GPS) signals which the navigation system largely relies on may easily be shielded by buildings and landforms resulting in poor reception quality in certain areas. Especially when the number of visible satellites for the navigation apparatus is less than four or when the navigation system is located at a weak-signal region, the navigation apparatus becomes incapable of providing required positioning data. Under such circumstances, even if positioning signals are received, it is possible that positioning values calculated from the received GPS signals are quite different from actual values such that a current location may be misjudged.

To improve positioning accuracy, current research has mainly focused on differential GPS (DPGS), dead reckoning (DR), inertial navigation systems (INS) and map matching (MMT) to provide a better solution.

Figure 1:
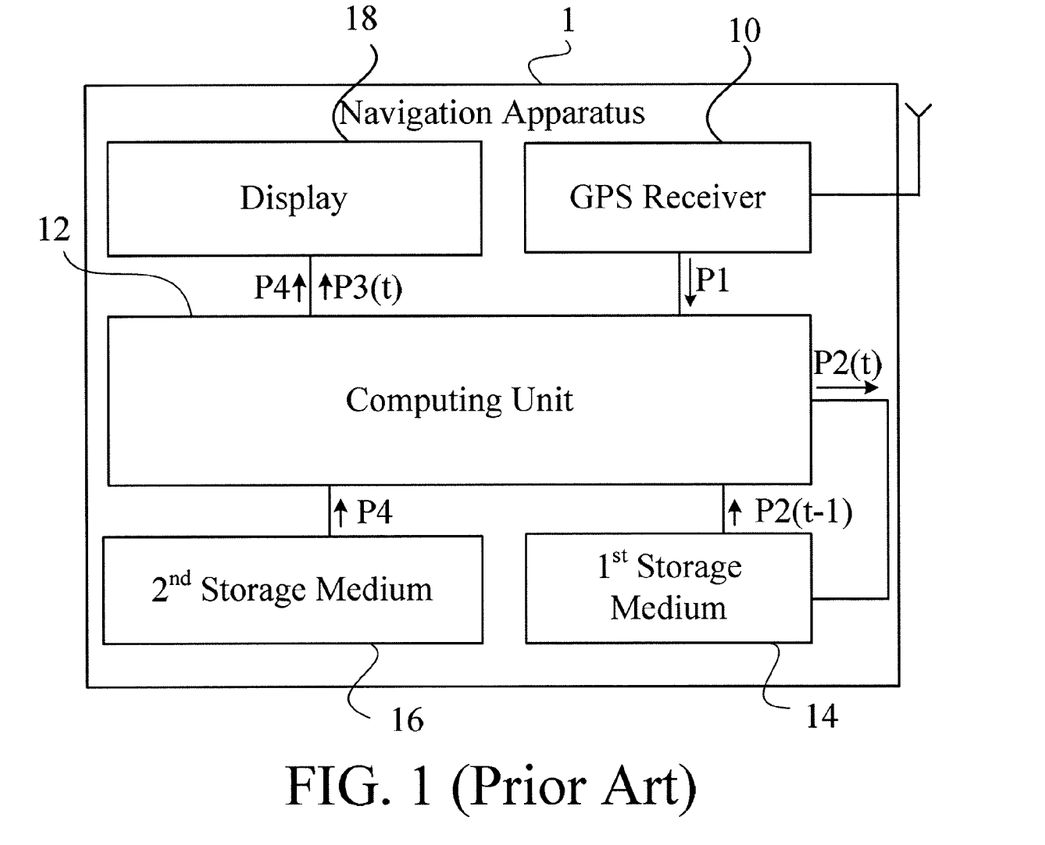
FIG. 1 is a functional block diagram of a navigation apparatus of the prior art.

How a navigation apparatus of the prior art utilizes the MMT function for performing positioning calculations shall be discussed below. Referring to FIG. 1, a navigation apparatus 1 comprises a GPS receiver 10, a computing unit 12, a first storage medium 14, a second storage medium 16 and a display device 18. The GPS receiver 10 receives a GPS signal P1. The first storage medium 14 stores a previous position-velocity-time (PVT) data P2(t−1). Note that PVT data contain information of position, velocity and time offset. The second storage medium 16 stores map data P4. The computing unit 12 computes a current PVT data P2(t) according to the GPS signal P1 and the previous PVT data P2(t−1). According to the map data P4 and the computed current PVT data P2, the computing unit 12 then computes a current MMT result P3(t). At this point, the display device 18 displays the map data P4 and the current MMT result P3(t) acquired by the computing unit 12.

In an MMT algorithm, a matching operation is performed between the map data P4 and the current positioning parameter P2(t), so as to calibrate the current PVT data P2(t) onto a current route and increase positioning accuracy. However, since the positioning computations of the navigation apparatus 1 are solely based on the previous PVT data P2(t−1) and the GPS signal P1, and due to significant errors in the imported values, the navigation apparatus 1 can hardly calibrate the current PVT data P2(t) onto the correct route even if the current PVT data P2(t) is calibrated using MMT. In addition, since the current PVT data P2(t) acquired from the computation at a current time point includes a certain degree of error, which is accounted when the current PVT data P2(t) is imported as a previous PVT data P2(t−1), a computation at a next time point to lead to accumulative errors. More specifically, in the prior art, in addition to the computed values imported by the navigation apparatus 1 being not considered accurate enough, the errors are also accumulated along with time such that the current MMT result P3(t) acquired is not likely to reflect a correct route.

Therefore, the present invention provides a navigation apparatus and a positioning method thereof, which are capable of increasing positioning accuracy for overcoming the aforesaid issues.

SUMMARY OF THE INVENTION

An objective of the invention is to provide a positioning method, which imports a previous map-matching parameter for computing a current positioning parameter to acquire a more accurate position value.

According to one embodiment of the invention, a positioning method for a navigation apparatus is provided. The method comprises: a) storing a previous positioning parameter and a previous map-matching parameter; b) receiving a positioning signal; c) reading the previous positioning parameter and the previous map-matching parameter; and d) computing a current positioning parameter according to at least one of the previous positioning parameter and the previous map-matching parameter, as well as according to the positioning signal.

Another objective the invention is to provide a navigation system, which imports a previous positioning parameter for computing a current positioning parameter to acquire a more accurate position value.

According to one embodiment of the invention, a navigation apparatus comprises a first storage medium, a GPS receiver and a computing unit. The first storage medium stores a previous positioning parameter and a previous map-matching parameter. The GPS receiver receives a positioning signal. The computing unit, coupled to the first storage medium and the GPS receiver, reads the previous positioning parameter and the previous map-matching parameter, and computes a current positioning parameter according to the positioning signal, the previous positioning parameter and the previous map-matching parameter.

In the prior art, computations for a current positioning parameter require a previous positioning parameter and a positioning signal. Supposing the previous positioning parameter or the positioning signal is deviated from actual position value, the computed current positioning parameter is bound to deviate even further away from the actual position value due to accumulative deviation. Therefore, because a map-matching parameter is a computation result of calibration and matching using a map data, the invention adopts the map-matching parameter for performing the computation in conjunction with the previous positioning parameter and the positioning signal to acquire a more accurate current positioning parameter. In a subsequent MMT algorithm, a more accurate map-matching parameter, i.e., a more accurate position value, is acquired. Further, according to the invention, the map-matching parameter computed at a current time point is taken into account during a computation at a next time point, whereby the navigation apparatus is allowed to gradually calibrate according to the map-matching parameter acquired from a previous computation and thus avoid the issue of accumulative positioning deviation.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 2A:
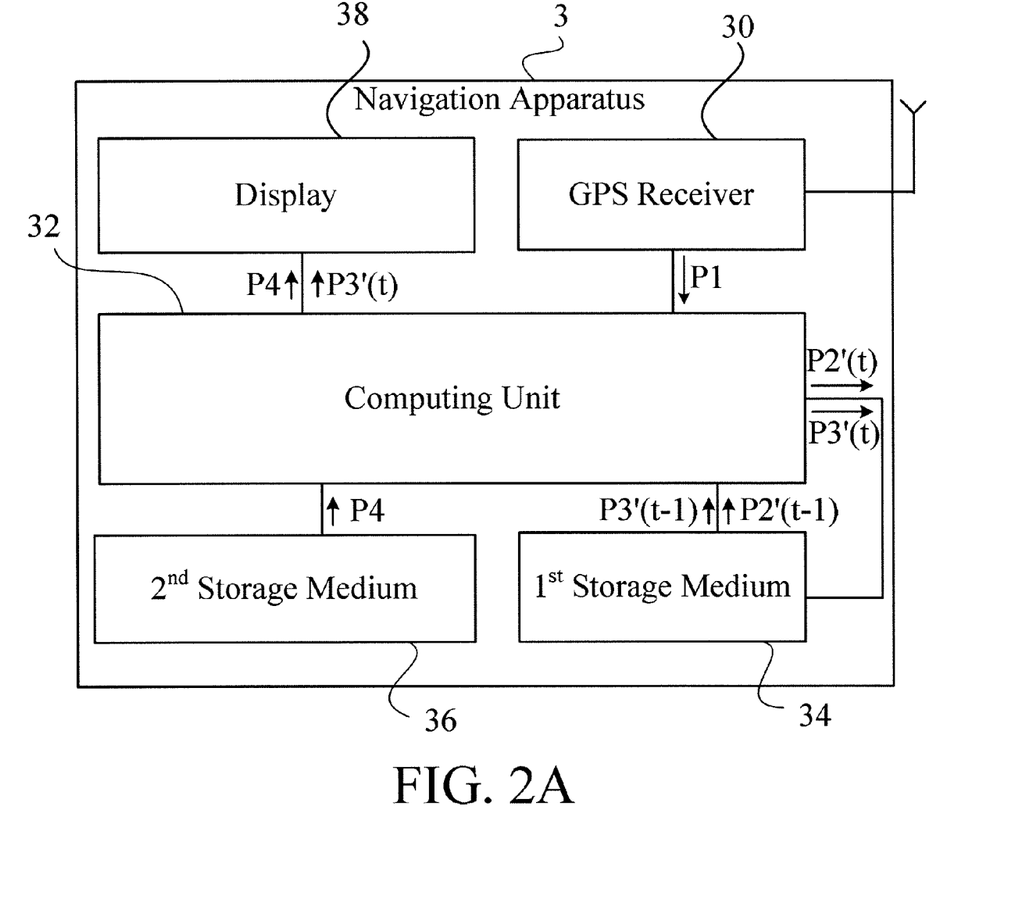
FIG. 2A is a detailed functional block diagram of a navigation apparatus according to one embodiment of the invention.
Figure 2B:
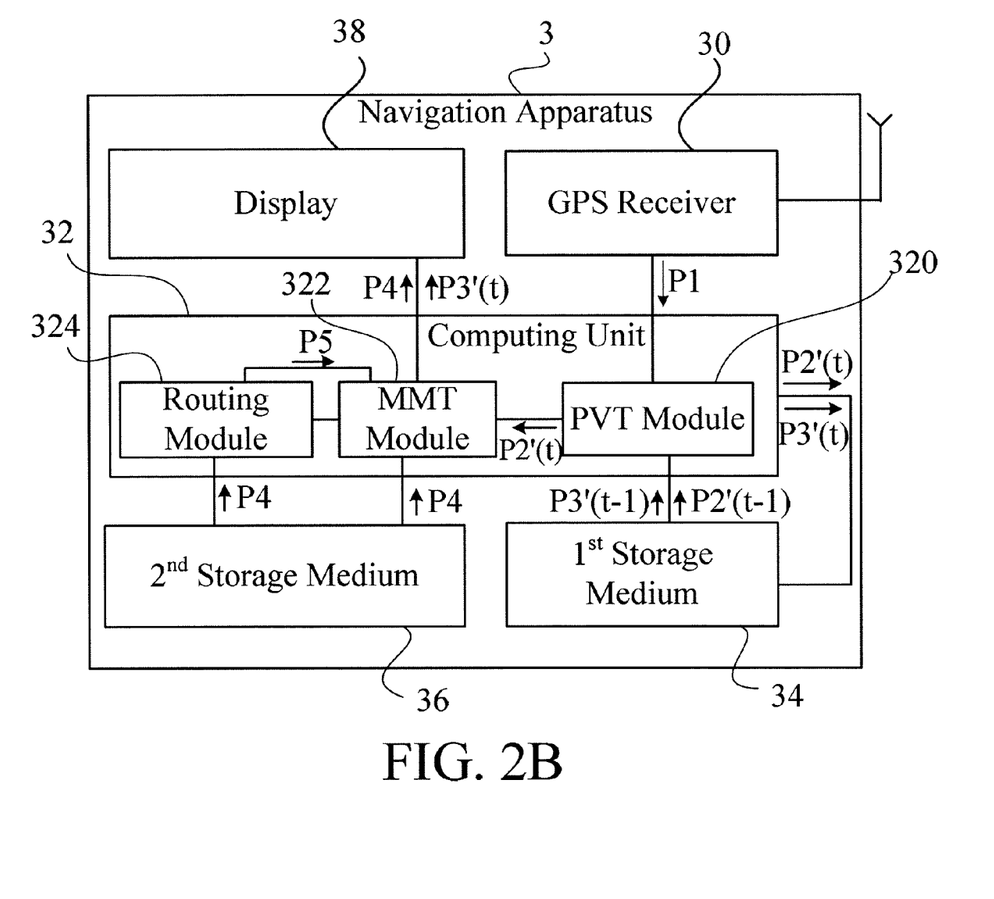
FIG. 2B is a detailed functional block diagram of the navigation apparatus in FIG. 2A.

FIGS. 2A and 2B show functional block diagrams of a navigation apparatus 3 according to one embodiment of the invention. As shown, the navigation apparatus 3 comprises a Global Positioning System (GPS) receiver 30, a computing unit 32, a first storage medium 34, a second storage medium 36 and a display device 38. The navigation apparatus 3 according to the invention is any electronic apparatus having navigation capabilities, such as a GPS mobile phone or a portable navigation device (PND). The navigation apparatus 3 may also comprise an independent GPS receiver and an electronic apparatus having data processing capabilities, such as a Bluetooth GPS receiver provided with a mobile phone having Bluetooth capabilities; that is, the GPS receiver is an externally connected device. The mobile phone may execute navigation software stored in a storage medium therein to perform the positioning method according to the invention based on GPS signals transmitted from the Bluetooth GPS receiver.

The GPS receiver 30 receives a GPS signal P1. The first storage medium 34 stores a previous position-velocity-time (PVT) data P2'(t−1) and a previous map matching (MMT) result P3'(t−1). The second storage medium 36 stores map data P4. The computing unit 32, according to the GPS signal P1, the previous PVT data P2'(t−1) and the previous MMT result P3'(t−1), computes a current PVT data P2'(t). The computing unit 32 then, according to the map data P4 and the acquired current PVT data P2'(t), computes a current MMT result P3'(t), which includes a current position value and a current azimuth value. At this point, the display device 38 displays a map based on the map data P4, and the current MMT result P3'(t) acquired by the computing unit 32. Further, supposing the current PVT data P2'(t) and the current MMT result P3'(t) are valid, the computing unit 32 stores the same into the first storage medium 34 to provide the previous PVT data P2'(t−1) and the previous MMT result P3'(t−1) for a next positioning computation.

Compared to the prior art shown in FIG. 1, the method according to the invention additionally takes into consideration the previous MMT result P3'(t−1) when computing the current PVT data P2'(t), so that calibration is performed to acquire a current PVT data that is closer to a correct route. Therefore, by computing the current MMT result P3'(t) with reference to the current PVT data P2'(t), the calculated positioning result is made more accurate by using the MMT P3'(t) that is closer to the correct route. Moreover, since each computed MMT result is used by a next PVT computation, errors in positioning are reduced to further avoid accumulative errors.

FIG. 2B shows a detailed functional block diagram of the navigation apparatus 3 shown in FIG. 2A. The computing unit 32 comprises a PVT computing module 320 and an MMT module 322. The PVT computing module 320, coupled to the first storage 34 and the GPS receiver 30, computes the current PVT data P2'(t) according to the GPS signal P1, the previous PVT data P2'(t−1) and the previous MMT result P3'(t−1). The MMT module 322, coupled to the second storage medium 36 and the PVT computing module 320, computes the current MMT result P3'(t) according to the current PVT data P2'(t) and the map data P4.

The computing unit 32 may further comprise a routing module 324 coupled to the second storage medium 36 and the MMT module 322. The routing module 324, according to user-defined settings, e.g., an origin, a destination and routing requirements, and the map data P4, generates a planned route P5. Provided that the user programs the navigation apparatus 3 for route planning, the MMT module 322 may then calculate the current MMT result P3'(t) further according to the planned route P5.

Figure 3:
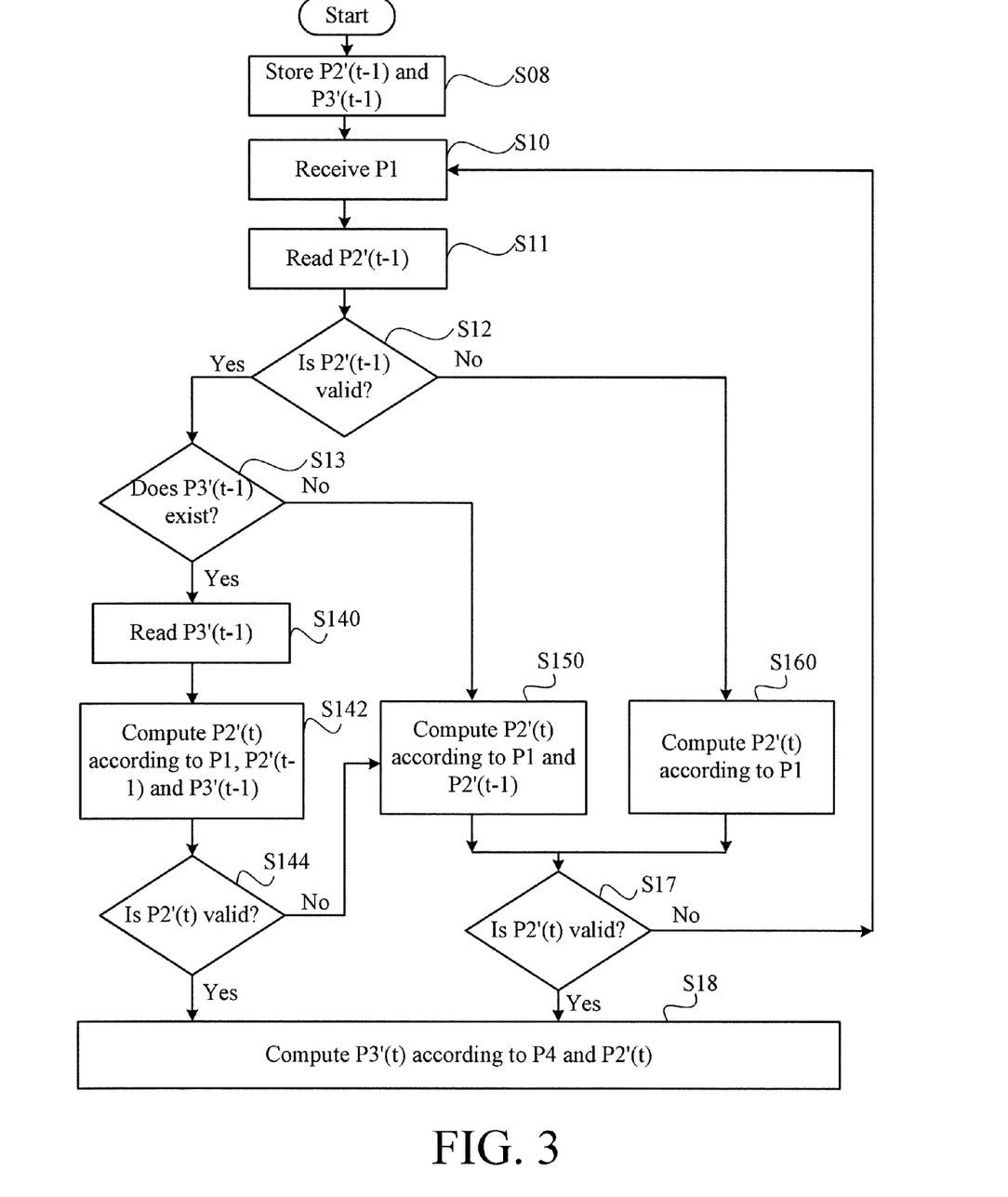
FIG. 3 is a flowchart of a positioning method according to one embodiment of the invention.

To better understand the positioning method implemented by the navigation apparatus 3 according to the invention, reference is made to FIG. 3 showing a flowchart of the positioning method according to one embodiment of the invention.

The positioning method implemented by the navigation apparatus 3 involves two main stages. The computing unit 32 computes a current PVT data P2'(t) as a first stage, followed by substituting the current PVT data P2'(t) into the MMT algorithm to acquire a current MMT result P3'(t) in a second stage. The display device 38 of the navigation apparatus 3 then displays the current position value and the current azimuth value in the current MMT result P3'(t).

Dependent on different circumstances, the current PVT data is computed in three different computation methods according to: 1) the previous PVT data, the MMT result and the GPS signal; 2) the previous PVT data and the GPS signal; and 3) the GPS signal. However, each of all the computation methods has prerequisite conditions, which are first established before performing subsequent computations. With reference to FIG. 3, the methods of computing the current PVT data according to the invention comprise steps described below.

After Start, the previous PVT data and the previous MMT result are stored in Step S08.

In Step S10, a GPS signal is received.

In Step S11, the previous PVT data is read; that is, a PVT data acquired from a computation at a previous time point is read.

In Step S12, it is determined whether the previous PVT data is valid. For example, it is determined whether the previous PVT data is valid according to a root-mean-square (RMS) algorithm and a receiver autonomous integrity monitoring (RAIM) checking.

When the result from Step S12 is negative, i.e., the previous PVT data is invalid, Step S160 is performed. In Step S160, the current PVT data is computed according to the GPS signal, as the third method for computing the current PVT data specified above. In practice, the current PVT data is computed according to the GPS signal using a least square method.

When the result from Step S12 is affirmative, i.e., the previous PVT data is valid, Step S13 is performed. In Step S13, it is determined whether the previous MMT result, which is an MMT result acquired from a computation at a previous time point, is present. In the event that the previous MMT result is absent, Step S150 is performed, in which the current PVT data is computed according to the previous PVT data and the GPS signal, as the second method for computing the current PVT data specified above.

When the result from S13 is affirmative, i.e., the previous MMT result is present, Step S140 is performed to read the previous MMT result, followed by performing Step S142. In Step S142, the current PVT data is computed according to the previous PVT data, the previous MMT result and the GPS signal, as the first method for computing the PVT data specified above. For example, according to the GPS signal, a previous velocity and a previous time offset of the previous PVT data, and a previous MMT position value and a previous MMT azimuth value of the previous MMT result, the current PVT data is computed using Kalman filtering.

After performing the second or the third method for computing the current PVT data, that is, after performing Step S150 or Step S160, Step S17 is performed to determine whether the current PVT data is valid. Similar to the method for determining whether the current PVT data is valid in the foregoing description, it is determined whether the current PVT data is valid according to an RMS algorithm and an RAIM checking. In the event that the current PVT data is invalid, the flow returns to Step S10 to restart another computation until all the acquired current PVT data are valid for subsequent MMT algorithms. In the event that the current PVT data is valid, Step S18 is performed to selectively compute a current MMT result according to the map data and the current PVT data; that is, MMT algorithms may then proceed.

Further, after performing Step S142 of the first method for computing the current PVT data, Step S144 is performed to determine whether the current PVT data is valid. In the event that the current PVT data is invalid, the flow returns to Step S150, with description of the subsequent steps omitted for brevity. In the event that the current PVT data is valid, Step S18 is performed to selectively compute a current MMT result according to the map data and the current PVT data; that is, MMT algorithms may then proceed.

Figure 4:
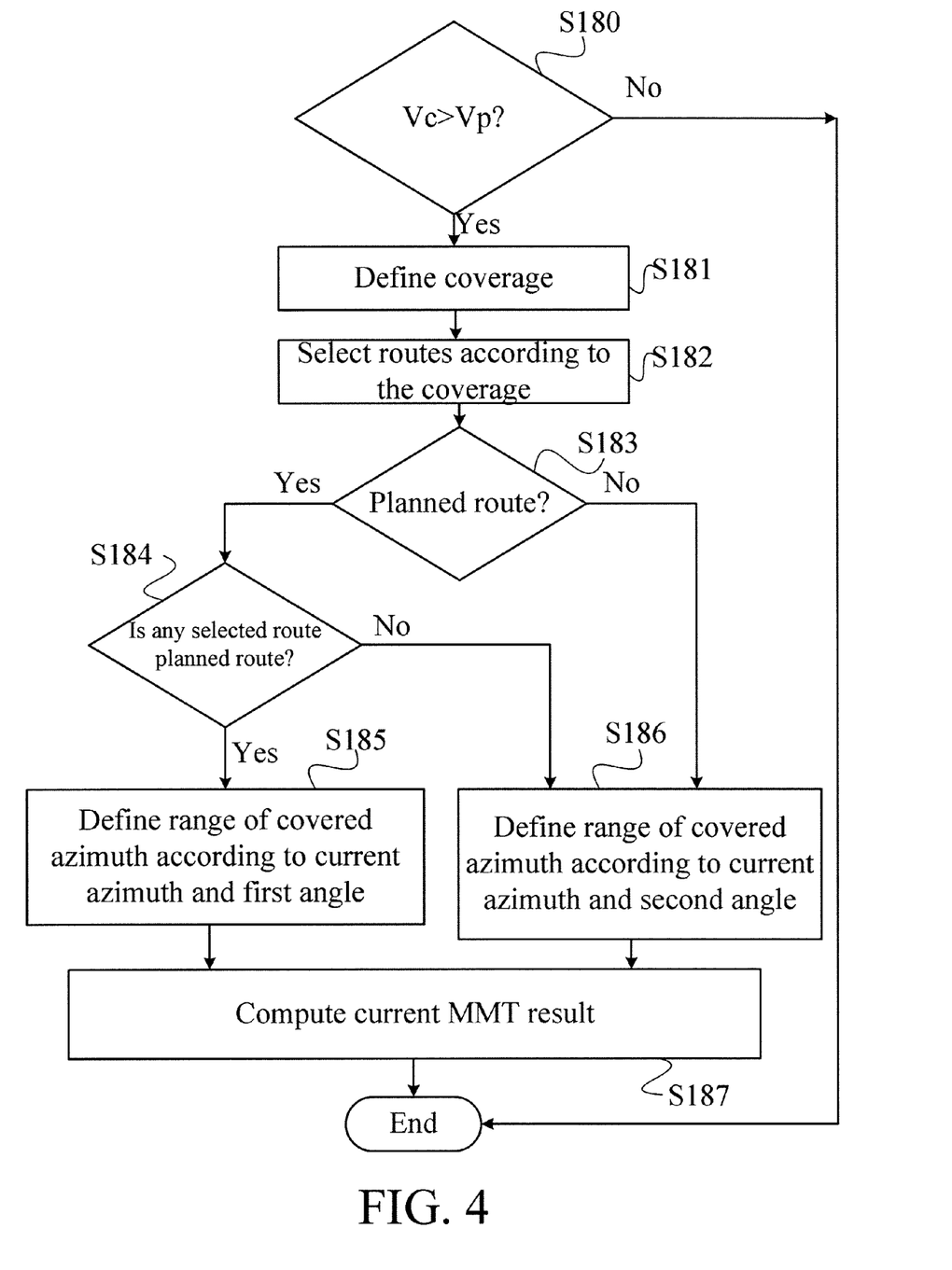
FIG. 4 is a detailed flowchart of Step S18 in FIG. 3.

The flow for computing the current PVT data in the positioning method is as discussed above. To compute the current MMT result, which is for computing a final position result, the current PVT data need be substituted into the MMT algorithm. The MMT algorithm flow, more specifically Step S18, shall be described in detail in the following description, with reference to FIG. 4 showing a detailed flowchart of Step S18 in FIG. 3.

In the MMT algorithm, Step S180 is first performed to determine whether a current velocity of the current PVT data is greater than a predetermined velocity. When the result from Step S180 is negative, i.e., when the current velocity is too small, the current MMT result shall not be computed, such that a previous MMT result is unavailable for reference when implementing the positioning method at a next time point.

When the result from Step S180 is affirmative, i.e., when the current velocity of the current PVT data is larger than the predetermined velocity, Step S181 is performed to define a coverage according to a current position and a predetermined radius. In Step S182, a plurality of routes are selected from the map data according to the coverage. The selected routes are taken into account of a subsequent weighting calculation, in which distances between the routes and the current position, and differences between the azimuths of the routes and the current azimuth are taken into consideration. Note that the smaller the differences are, the more probable the current location matches a particular route.

Next, Step S183 is performed to determine whether a planned route is present; that is, it is determined whether the navigation apparatus 3 plans the route according to user-defined settings. When the result from Step S183 is affirmative, it means that a planned route is present. When the result is negative, Step S186 is performed to define a range of covered azimuth according to the current azimuth and a second angle.

In Step S183, when it is determined that a planned route is present, Step S184 is performed to determined whether any of the routes is the planned route. When the result from Step S184 is affirmative, Step S185 is performed to define a range of covered azimuth according to the current azimuth and a first angle, with a distance between the current position and the planned route subtracted by a predetermined length. In normal circumstances, the user travels under guidance of the planned route provided by the navigation apparatus. To match the current position as much as possible to the planned route, not only is the distance between the current position and the planned route subtracted by a predetermined length, but error tolerance of the current azimuth is increased, such that the planned route is predominant in the subsequent weighting calculation. Therefore, in Step S185 and Step S186, the first angle is larger than the second angle.

In Step S185 and Step S186, the distances between the current position and the routes, and the range of covered azimuth, are determined. Step S187 is then performed to compute the current MMT result according to the distances between the current position and the routes, the range of covered azimuth, and the current azimuths of the routes, to complete the MMT algorithm.

Figure 5:
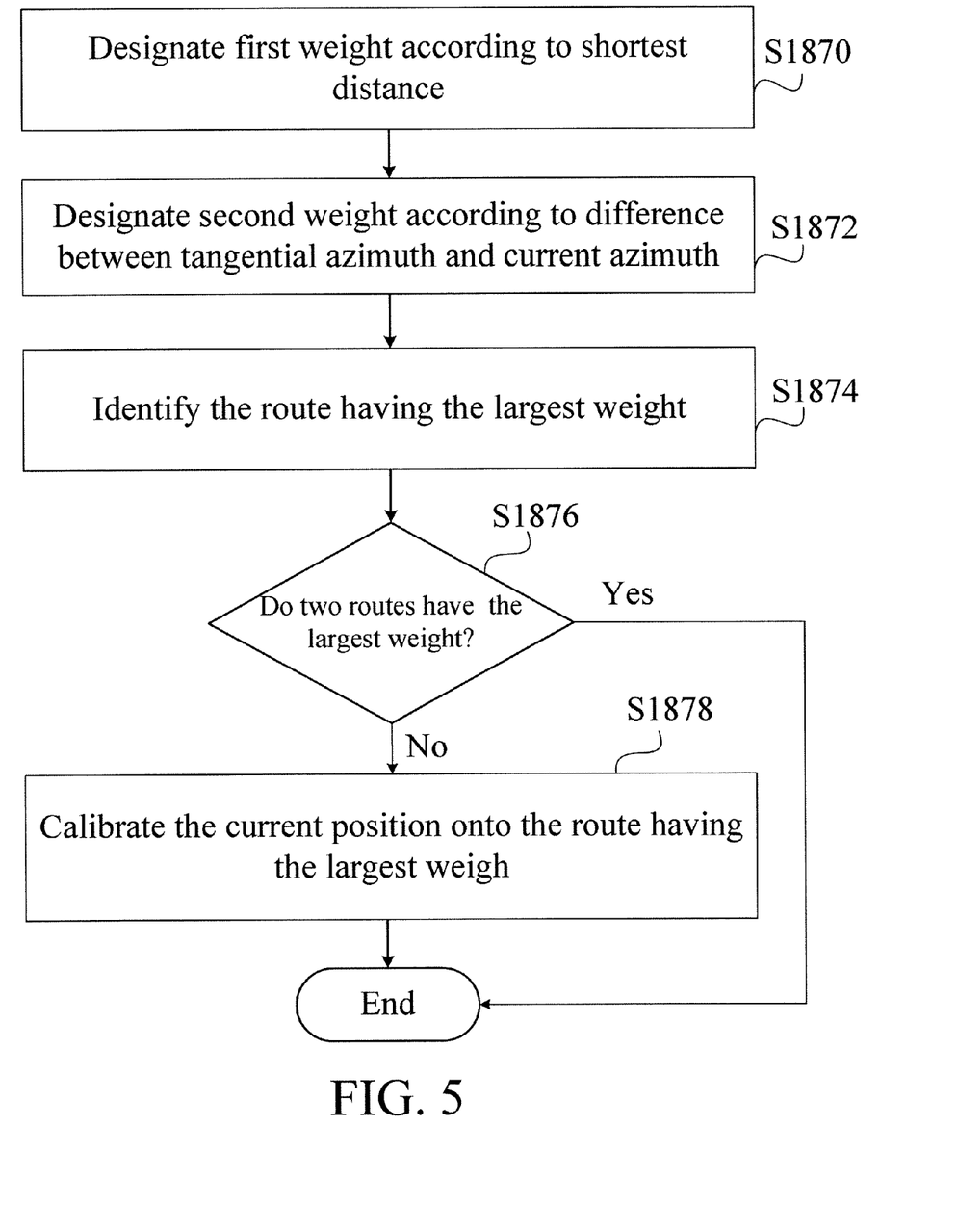
FIG. 5 is a detailed flowchart of Step S187 in FIG. 4.
Figure 6A:
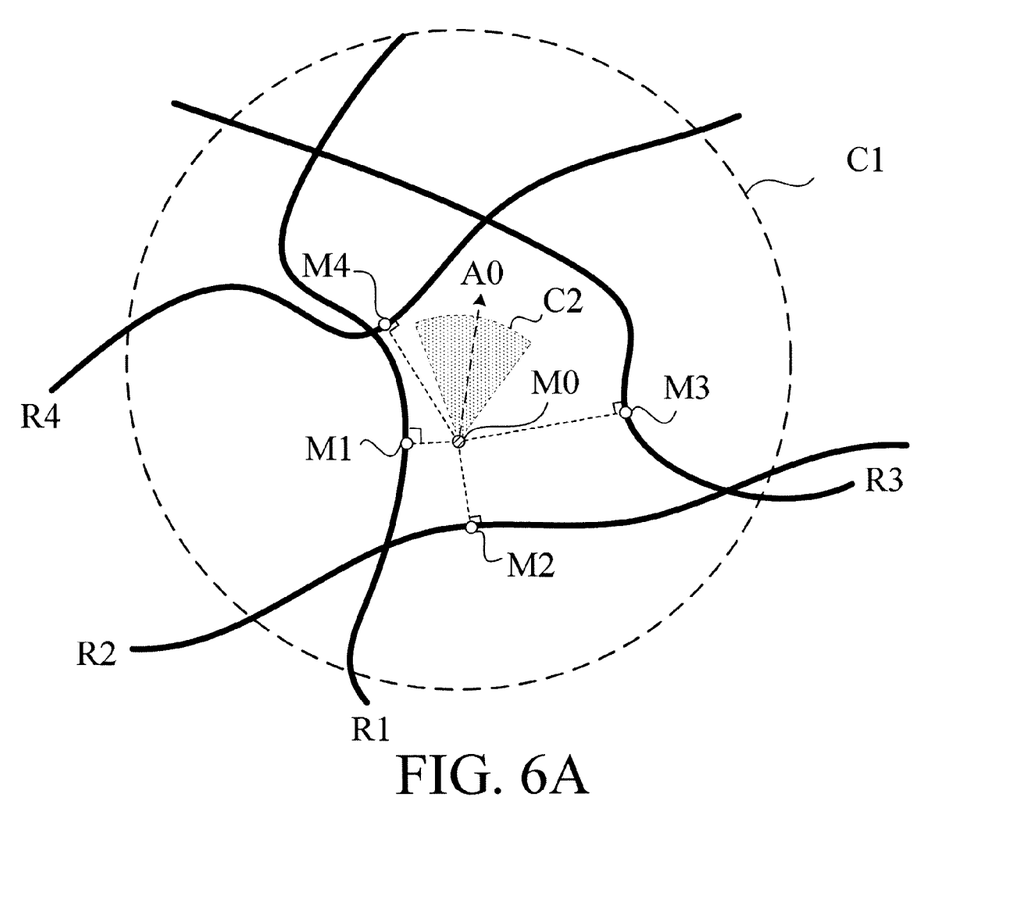
FIG. 6A is a schematic diagram corresponding to Step S1870 in FIG. 5.
Figure 6B:
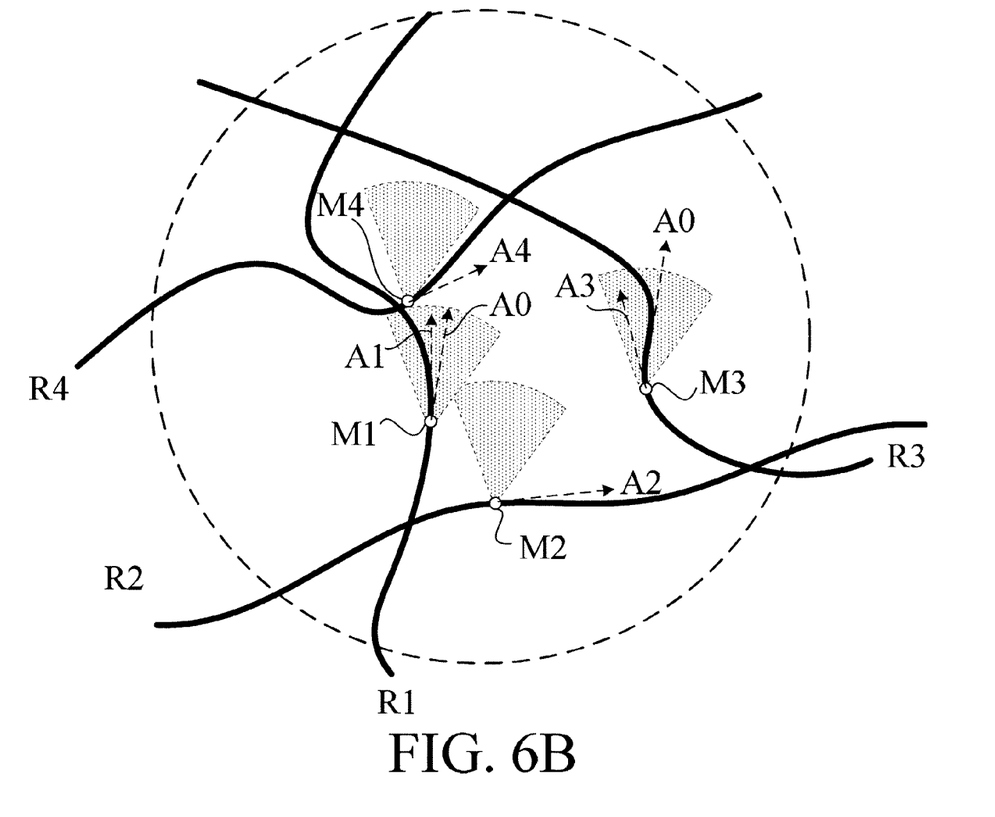
FIG. 6B is a schematic diagram corresponding to Step S1872 in FIG. 5.

FIGS. 5, 6A and 6B illustrate details of the MMT algorithm, in which the current MMT result is computed according to the distances between the current position and the routes, the range of covered azimuth, and the azimuths of the routes. FIG. 5 shows a detailed flowchart of Step S187 in FIG. 4. FIGS. 6A and 6B show schematic diagrams corresponding to Step S1870 and Step S1872 in FIG. 5, respectively.

In Step S182, according to a coverage C1, a plurality of routes are selected from the map data, such as the routes R1, R2, R3 and R4 in FIG. 6A.

Step S1870 is first performed, in which each of the routes is designated with a first weight according to a respective shortest distance between the routes and the current position. For example, referring to FIG. 6A, according to distances between a current position M0 and positions M1, M2, M3 and M4 on the routes, each of the routes R1, R2, R3 and R4 is designated with the first weight, wherein, the shorter the distance is, the larger the weight is designated. Suppose the route R3 is the planned route. In this embodiment, the route R1 is initially designated with a largest weight since the distance between the position M1 and the current position M0 is the shortest. However, in Step S185, the distance between the position M0 and the position M3 is subtracted by a predetermined length, and the route R3 consequently has a larger weight due to the reduced distance between the position M0 and the position M3. More specifically, it is probable that the route R3 has a larger first weight than the route R1 after subtracting the predetermined length from the route R3.

In the next Step S1872, it is determined whether tangential azimuths A1 to A4 at the positions M1 to M4 on the routes are situated within a coverage C2, and each of the routes R1 to R4 is designated with a second weight according to differences between the tangential azimuths A1 to A4 and the current azimuth A0. Referring to FIG. 6B, the tangential azimuths of the route R1, R2, R3 and R4 at the positions M1, M2, M3 and M4 are A1, A2, A3 and A4, respectively. The coverage C2 is compared with the tangential azimuths. Since the tangential azimuths A2 and A4 are not within the coverage C2, the routes R2 and R4 are eliminated, provided that the second weight thereof is zero. According to respective differences between the tangential azimuths A1 and A3, and the current azimuth A0, the routes R1 and R3 are designated with a second weight. In this embodiment, as shown in FIG. 6B, the tangential azimuth A1 is closer to indications of the current azimuth A0, and thus the route R1 is designated with a larger second weight.

Step S1874 is then performed. In Step S1874, according to the first weight and the second weight, a route having the largest weight out of all the routes is identified. By taking into consideration both the first and second weights, the routes R1, R2, R3 and R4 are arranged in sequence according to respective weight, and the route having the largest weight is identified.

In the next Step S1876, it is determined whether two or more routes have the largest weight. When the result from Step S1876 is affirmative, the MMT algorithm is terminated; that is, a choice is not made between the two routes both having the largest weight to avoid selecting a wrong route. When the result is negative, it means that the route having the largest weight is identified, and Step S1878 is performed to calibrate the current position onto the route having the largest weight. The calibrated position value serves for the current MMT position value of the current MMT result, and the azimuth of the route having the largest weight serves for the current MMT azimuth value of the current MMT result to complete the MMT algorithm. Referring to FIG. 6B, supposing the route R1 has the largest weight, the current position is calibrated to the position M1. To be exact, the current MMT position value is calibrated to the longitude and latitude of the position M1, and the current MMT azimuth value is calibrated to the tangential azimuth A1 at the position M1 on the route R1.

In the prior art, computations for a current PVT data require a previous PVT data and a GPS signal. Supposing the previous PVT data or the GPS signal is deviated from the actual position value, the computed current PVT data is bound to deviate even further away from the actual position value due to accumulative deviation. In continuation of the foregoing description, since an MMT result is a computation result of calibration and matching using the map data, the invention adopts the MMT for performing computation in conjunction with the previous PVT data and the GPS signal to acquire a more accurate current PVT data. In a subsequent MMT algorithm, a more accurate MMT result, i.e., a more accurate position value, is acquired. Further, according to the invention, the MMT result computed at a current time point is taken into account of a computation at a next time point, whereby the navigation apparatus is allowed to gradually calibrate according to the MMT result acquired from a previous computation and thus avoiding the issue of accumulative positioning deviation.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A positioning method for a navigation apparatus, comprising steps of:
    a) storing a previous positioning parameter and a previous map-matching parameter;
    b) receiving a positioning signal;
    c) reading the previous positioning parameter and the previous map-matching parameter; and
    d) determining a current positioning parameter according to the positioning signal, the previous positioning parameter, and a previous map-matching position value and a previous map-matching azimuth value associated with the previous map-matching parameter.

2. The positioning method as claimed in claim 1, wherein the step (d) is computing the current positioning parameter according to the positioning signal, a previous velocity and a previous time offset associated with the previous positioning parameter, and the previous map-matching position value and the previous map-matching azimuth value associated with the previous map-matching parameter.

3. The positioning method as claimed in claim 1, wherein the step (c) further comprises steps of:
    c1) determining whether the previous positioning parameter is valid;
    wherein, when it is determined the previous positioning parameter is invalid, the method further comprising:
    e) determining an initial positioning parameter, according to the positioning signal received by the navigation apparatus.

4. The positioning method as claimed in claim 1, wherein the step (c) further comprises steps of:
    c1) determining whether the previous map-matching parameter is present;
    wherein, when it is determined the previous map-matching parameter is absent, the current positioning parameter is computed in the step (d) according to the previous positioning parameter and the positioning signal.

5. The positioning method as claimed in claim 1, further comprising:
    f) determining whether the current positioning parameter is valid;
    wherein, when it is determined the current positioning parameter is invalid, the current positioning parameter is computed in the step (d) according to the previous positioning parameter and the positioning signal.

6. The positioning method as claimed in claim 1, the navigation apparatus comprising a map data, the method further comprising:
    g) selectively computing the current map-matching parameter according to the map data and the current positioning parameter.

7. The positioning method as claimed in claim 6, the positioning parameter comprising a current position value and a current azimuth value, the step (g) further comprising steps of:
    g1) defining a coverage according to the current position value and a predetermined radius, and selecting a plurality of routes from the map data according to the coverage;
    g2) determining whether a planned route is present;
    g3) determining whether any of the routes is the planned route when the planned route is present;
    g4) when the planned route is identified from the routes, defining a range of a covered azimuth according to the current azimuth value and a first angle, and subtracting a distance between the current position value and the planned route by a predetermined length;
    g5) when the planned route is absent or unidentified from the routes, defining a range of covered azimuth according to the current azimuth value and a second angle; and
    g6) determining the current map-matching parameter according to the current position value, the routes, the current azimuth value and the range of covered azimuth;

wherein, the first angle is larger than the second angle.

8. The positioning method as claimed in claim 7, wherein the step (g6) comprises a step of:
   g6-1) setting a weight of each of the routes according to the current position value, the current azimuth value, the routes and the range of covered azimuth.

9. The positioning method as claimed in claim 8, further comprising a step of:
   g6-2) selecting a route having the largest weight; calibrating the current position value to the selected route; and using the calibrated position value as a current position value of the current map-matching parameter, and the azimuth value of the selected route as a current azimuth value of the current map-matching parameter.

10. The positioning method as claimed in claim 8, wherein the step (g6-1) comprises steps of:
    g6-1-1) designating a first weight to each of the routes according to respective distances between the routes and the current position value;
    g6-1-2) matching the azimuth value of each of the routes with the range of covered azimuth, and designating a second weight to each of the routes according to respective differences between the azimuth values of each of the routes and the current azimuth value; and
    g6-1-3) setting the weight of each of the routes according to the first weight and the second weight of each of the routes.

11. A navigation apparatus, comprising:
    a first storage medium, stored with a previous positioning parameter data and a previous map-matching parameter;
    a receiver, for receiving a positioning signal; and
    a computing unit, coupled to the first storage medium and the receiver, for reading the previous positioning parameter and the previous map-matching parameter, and for determining a current positioning parameter according to the positioning signal, the previous positioning parameter, and a previous map-matching position value and a previous map-matching azimuth value associated with the previous map-matching parameter.

12. The navigation apparatus as claimed in claim 11, wherein the computing unit computes the current positioning parameter according to the positioning signal, a previous velocity and a previous time offset of the previous positioning parameter, and the previous map-matching position value and the previous map-matching azimuth value of the previous map-matching parameter.

13. The navigation apparatus as claimed in claim 11, wherein the computing unit computes the current positioning parameter using a Kalman filter.

14. The navigation apparatus as claimed in claim 11, further comprising:
    a second storage medium, for storing a map data, and selectively computing the current map-matching parameter according to the map data and the current positioning parameter.

15. The navigation apparatus as claimed in claim 14, wherein the computing unit comprises:
    a first computing module, coupled to the first storage medium and the receiver, for computing the current positioning parameter according to the positioning signal, the previous positioning parameter and the previous map-matching parameter; and
    a second module, coupled to the second storage medium and the PVT computing module, for computing the current map-matching parameter according to the current positioning parameter and the map data.

16. The navigation apparatus as claimed in claim 15, wherein the computing unit further comprises:
    a third module, coupled to the second storage medium and the second module, for generating a planned route;
    wherein, the second module computes the current map-matching parameter further according to the planned route.

17. The navigation apparatus as claimed in claim 12, wherein when the previous positioning parameter is invalid, the computing unit computing an initial positioning parameter according to the positioning signal by means of a root-mean-square (RMS) algorithm.

* * * * *